(12) United States Patent
Kosoburd et al.

(10) Patent No.: US 6,229,771 B1
(45) Date of Patent: May 8, 2001

(54) METHOD AND APPARATUS FOR GENERATING FOCUS ERROR SIGNALS IN A MULTI-BEAM OPTICAL DISK DRIVE

(75) Inventors: Tatiana Kosoburd, Lod (IL); Amir Alon, Sunnyvale, CA (US); Shlomo Shapira, Petach-Tikva; Michael Naor, Rehovot, both of (IL)

(73) Assignee: Zen Research (Ireland), Ltd., Dublin (IE)

(*) Notice: Subject to any disclaimer, the term of this patent is extended or adjusted under 35 U.S.C. 154(b) by 0 days.

(21) Appl. No.: 09/169,212

(22) Filed: Oct. 9, 1998

(51) Int. Cl.$^7$ ................................................. G11B 7/095
(52) U.S. Cl. ................................. 369/44.23; 369/44.37; 369/44.42; 369/95; 369/112.15; 369/112.12
(58) Field of Search ............................... 369/44.37, 112, 369/54, 94, 102, 103, 48, 44.38, 44.32, 44.41, 122, 121, 44.42, 95

(56) References Cited

U.S. PATENT DOCUMENTS

| | | | |
|---|---|---|---|
| 4,001,493 | * 1/1977 | Cone | 369/95 |
| 4,283,777 | 8/1981 | Curry et al. | 369/32 |
| 4,459,690 | 7/1984 | Corsover et al. | 369/44 |
| 4,720,825 | 1/1988 | Kokado | 369/46 |
| 5,105,407 | * 4/1992 | Ishika | 369/44.37 |
| 5,132,953 | * 7/1992 | Matsubayashi | 369/44.37 |
| 5,140,577 | 8/1992 | Ohsato | 369/44.37 |
| 5,144,616 | * 9/1992 | Yasukawa et al. | 369/122 |
| 5,155,718 | 10/1992 | Hashimoto et al. | 369/44.32 |
| 5,195,081 | 3/1993 | Usui | 369/112 |
| 5,210,730 | 5/1993 | Hayashi et al. | 369/44.37 |
| 5,239,529 | * 8/1993 | Tobita et al. | 369/48 |
| 5,283,778 | 2/1994 | Maeda | 369/112 |
| 5,365,535 | 11/1994 | Yamaguchi | 372/38 |
| 5,394,385 | 2/1995 | Sakurada et al. | 369/44.23 |
| 5,406,543 | 4/1995 | Kobayashi | 369/121 |
| 5,426,623 | 6/1995 | Alon et al. | 369/32 |
| 5,471,454 | 11/1995 | Tani | 369/100 |
| 5,572,493 | * 11/1996 | Maeda et al. | 369/44.28 |
| 5,583,836 | 12/1996 | Rokutan et al. | 369/44.28 |

(List continued on next page.)

FOREIGN PATENT DOCUMENTS

| | | |
|---|---|---|
| 0 388 760 A1 | 9/1990 | (EP). |
| 0 441 435 A1 | 8/1991 | (EP). |
| 0 545 526 A1 | 6/1993 | (EP). |
| 62-60731 | 12/1987 | (JP). |
| 4-332921 | 11/1992 | (JP). |
| 88 02169 | 3/1988 | (WO). |

OTHER PUBLICATIONS

H. Nakajima et al., *Compact Disc Technology* (translated by C. Aschmann), pp. 140–142, (1992).

K. Pohlmann, "*The Compact Disc Handbook*," A–R Editions Inc., pp. 108–117, Second edition 1992.

Lee, "High Efficiency Multiple Beam Gratings," *Applied Optics*, vol. 18, pp. 2152–2158, (July 1979).

Lee, "Binary Synthetic Holograms," *Applied Optics*, vol. 13, pp. 1677–1682, (July 1974).

*Primary Examiner*—W. R. Young
*Assistant Examiner*—Kim-Kwok Chu
(74) *Attorney, Agent, or Firm*—Fish & Neave; Nicola A. Pisano

(57) ABSTRACT

A focus detection system for use in a multi-beam optical pickup assembly is provided that uses an optical element, either a holographic element or diffractive element, to split beams reflected off of a data-bearing surface of an optical disk into a plurality of data beams and a plurality of focus beams. The optical element also introduces astigmatism into the focus beams. The focus beams are projected onto focus detectors configured to account for overlap between adjacent focus beams to produce an accurate focus error signal.

29 Claims, 6 Drawing Sheets

U.S. PATENT DOCUMENTS

| | | | |
|---|---|---|---|
| 5,598,393 | * 1/1997 | Alon et al. | 369/102 |
| 5,608,716 | 3/1997 | Koyama et al. | 369/275.1 |
| 5,717,667 | 2/1998 | Horimai et al. | 369/44.23 |
| 5,729,512 | * 3/1998 | Alon | 369/44.32 |
| 5,761,174 | 6/1998 | Takeda et al. | 369/103 |
| 5,774,432 | * 6/1998 | Alon et al. | 369/44.23 |
| 5,808,986 | * 9/1998 | Jewell et al. | 369/44.37 |
| 5,835,471 | 11/1998 | Miyamoto et al. | 369/109 |
| 5,854,780 | 12/1998 | Opheij et al. | 369/112 |

* cited by examiner

METHOD AND APPARATUS FOR GENERATING FOCUS ERROR SIGNALS IN A MULTI-BEAM OPTICAL DISK DRIVE

FIELD OF THE INVENTION

The present invention relates to focus systems for use in optical disk drives that read and write optical disks. More specifically, the present invention provides a focus detector for use with a multi-beam optical system for reading or writing multiple tracks of an optical disk simultaneously.

BACKGROUND OF THE INVENTION

Due to their high storage density, long data retention life, and relatively low cost, optical disks have become the predominant media format for distributing information. Large format disks, and more recently, DVD disks, have been developed for storing full length motion pictures. The compact disk (CD) format was developed and marketed for the distribution of musical recordings and has replaced vinyl records. High-capacity, read-only data storage media, such as CD-ROM and DVD-ROM, have become prevalent in the personal computer field, and the DVD format may soon replace videotape as the distribution medium of choice for video information.

Recently, relatively inexpensive optical disk writers and writable optical media have become available, making optical disks popular as backup and archival storage devices for personal computers. The large storage capacity of writable optical disks also makes them ideal for use in multimedia authoring and in other applications that require access to large amounts of storage. Current writable optical disk technologies include several write-once technologies, such as CD-Recordable (CD-R) and DVD-Recordable (DVD-R); a few technologies permit writing, erasing, and rewriting data on a disk, such as Mini-Disk (MD), which uses magneto-optical technology; still others use phase-change and dye-polymer technology. Recent advances in writable optical disk technology have made rewritable optical media more practical, and the specification for DVD-RAM calls for use of high-capacity rewritable optical media.

An optical disk is made of a transparent disk or substrate in which data, in the form of a serial bit-stream, are encoded as a series of pits in a reflective surface within the disk. The pits are arranged along a spiral or circular track. Data are read from the optical disk by focusing a low power laser beam onto a track on the disk and detecting the light reflected from the surface of the disk. By rotating the optical disk, the light reflected from the surface of the disk is modulated by the pattern of the pits rotating into and out of the field of laser illumination. Optical and imaging systems detect the modulated, reflected, laser light and produce an electrical signal that is decoded to recover the digital data stored on the optical disk.

Data is typically recorded on writable optical disks by using a higher power laser than is used for reading. The media for use with optical disk writers typically includes a recording layer, made of a material that changes its optical characteristics in response to the presence of the beam from the high power laser. The high power laser is used to create "pits" in the recording layer that have a different reflectivity than surrounding areas of the disk, and that can be read using a lower power reading beam. In systems having the ability to erase and re-record data, a laser having a power output between the low power used for reading and the high power used for writing may be used to erase data. Alternatively, some systems employ a laser that outputs a different wavelength of light to erase data from the optical media. The methods used to write and erase optical disks depend on the type of recordable media being used.

To write or retrieve data from an optical disk, the foregoing optical systems include a pickup assembly that may be positioned to read or write data on any disk track. Servo mechanisms are provided for focusing the optical system and for keeping the pickup assembly positioned over the track, despite disk warpage or eccentricity.

The automatic focus system used in an optical disk drive must be very sensitive. If the system is not able to properly focus light onto the surface of the disk, the phase interference between the light reflected from the pits and from the areas surrounding the pits may be lost, making the data unreadable. For writing, improper focus may cause the energy of the writing beam to be spread over too large an area to permit effective writing of the optical disk.

Even the most carefully manufactured disk is not perfectly flat, and even the best optical disk reader is unable to spin the disk at the required speeds of 200 RPM and higher with no variation in the vertical offset of the disk. The specifications for reading a compact disk (CD), for example, allow for variation in the vertical offset of the disk of ±600 microns, while the beam must remain focussed to within ±2 microns. It is therefore necessary to have a focus system that is able to keep the surface of the disk in focus as the vertical offset of the disk varies.

Focus systems generally used in optical disk readers measure certain parameters of the light spot formed by the illumination beam reflected from the optical disk. One previously known method of detecting focus errors in optical disk readers is the astigmatism method. In this method, a cylindrical lens is placed in the optical path of the system to introduce astigmatism into the reflected beam. The beam is then focussed onto a quadrant detector consisting of four equal-area photodetector segments.

When the beam is in focus, the image projected onto the detector is circular, with light falling equally on all four segments of the detector. When the beam is out of focus, the astigmatism introduced by the cylindrical lens causes the image projected onto the quadrant detector to become elliptical, so that two of the segments of the detector receive more light than the other two, depending on the direction and degree to which the system is out of focus. Signals from the segments of the quadrant detector are arithmetically combined to produce a focus error correction signal. That signal is in turn used to drive a servo that moves an objective lens toward or away from the surface of the optical disk to keep the disk in focus. More information on the astigmatism method, and other methods of detecting and correcting focus errors in optical disk readers may be found at pages 140–142 of H. Nakajima and H. Ogawa, *Compact Disc Technology*, (translated by C. Aschmann), published by Ohmsha, Ltd., Japan (1992), and at pages 111–117 of K. Pohlmann, *The Compact Disc Handbook*, (2nd ed. 1992), published by A-R Editions, Inc., Madison, Wis.

Because in most previously known systems the data are read from the disk serially, i.e. one bit at a time, the maximum data transfer rate for an optical disk reader is determined by the rate at which the pits pass by the pickup assembly. The linear density of the bits and the track pitch are fixed by the specification of the particular optical disk format. For example, CD disks employ a track pitch of 1.6 μm, while DVD employs a track pitch only about one-half as wide.

Previously known methods of increasing the data transfer rate of optical disk readers and writers have focused on increasing the rate at which the pits pass by the pickup assembly by increasing the rotational speed of the disk itself. Currently, constant linear velocity (CLV) drives with rotational speeds of up to 16× standard speed are commercially available, and even faster reading speeds have been achieved using constant angular velocity designs. Higher disk rotational speeds, however, place increasing demands on the optical and mechanical subsystems within the optical disk player, create greater vibration, and may make such players more difficult and expensive to design and manufacture. Higher rotation speeds also make accurately writing data to a disk more difficult, so few CD-R systems are available that record at faster than 4× standard speed.

A cost effective alternative to increasing the disk rotational speed is to read multiple data tracks simultaneously, as described in commonly assigned U.S. Pat. No. 5,426,623 to Alon et al. In accordance with the methods and apparatus provided therein, for example, ten adjacent data tracks may be read simultaneously. Thus, even if the disk is rotated at only 4× the standard speed, the capability to read ten tracks simultaneously provides the equivalent of a 40× drive.

It should be noted that as used herein, a data track is a portion of the spiral data track of a typical optical compact disk that follows the spiral for one rotation of the disk. Thus, a drive capable of reading multiple data tracks simultaneously reads multiple such portions of the spiral data track at once. For optical disks having concentric circular tracks, a data track would refer to one such circular track. For disks having multiple concentric spiral tracks, a data track would refer to one of the concentric spiral tracks.

One way that a drive capable of reading and writing multiple data tracks simultaneously may be implemented is through use of multiple beams, arranged so that each beam illuminates a single data track on the disk. U.S. Pat. No. 5,144,616 to Yasukawa et al. shows a system in which multiple laser diode emitters are used to provide multiple beams. Other methods may also be used to provide multiple beams, though some of these methods may not be appropriate for use in writing multiple tracks simultaneously. U.S. Pat. No. 4,459, 690 to Corsover, for example, describes a multi-beam system in which an illumination beam generated by a single laser source is split into multiple beams using an acousto-optic device that dithers the beam in a direction normal to the track direction.

The beams in a multi-beam optical pickup may also be provided by using a diffractive element to split a single beam into multiple beams. This technique is used to generate the beams in a three-beam tracking system, as shown in *The Compact Disc Handbook*, Pohlmann, K., 2nd ed., A-R Editions, 1992, pp. 108–115. In commonly assigned, copending U.S. patent application Ser. No. 08/911,815, a diffractive element is used to split an illumination beam into a plurality of reading beams. Through careful design, it is possible to produce a diffractive element capable of generating multiple reading beams properly aligned with the data tracks of an optical disk.

Multi-beam systems, however, may cause difficulties for automatic focus systems. If the astigmatism method is used with a standard cylindrical lens, for example, the image of the spots projected onto the focus detector may have a relatively large diameter. While this is not a problem for a single beam system, in a multi-beam system, the spacing between the beams places severe constraints on the size of the focus detector. If the detector is too large, multiple spots will impinge in the detector. The large diameter of the spots in such a system may also cause crosstalk between neighboring beams in a multi-beam system.

Additionally, the elliptical spots projected when the system is out of focus may be much larger than the circular spots that are projected when the beam is in focus. Thus, for example, when multiple beams are used, the elliptical projections of the multiple beams may extend beyond the focus error -detector, multiple spots may impinge on the focus detector, or the spots may overlap each other, thus making it difficult to obtain a focus error signal that accurately measures the magnitude of the focus error.

It would therefore be desirable to provide a focus error detection system designed for use in a multi-beam optical pickup.

It also would be desirable to provide a focus detection system that accounts for overlap between the spots projected by a multi-beam optical pickup.

SUMMARY OF THE INVENTION

In view of the foregoing, it is an object of the present invention to provide a focus error detection system designed for use in a multi-beam optical pickup.

It is also an object to this invention to provide a focus detection system that accounts for overlap between the spots projected by a multi-beam optical pickup.

These and other objects of the present invention are achieved using an optical system that includes an optical element, either a holographic element or diffractive grating, that generates a separate set of spots for use in determining the focus error. These spots are directed onto multi-element focus detectors configured to account for overlap between the spots projected by a multi-beam optical pickup.

In a first embodiment, a quadrant detector having adjacent segments of unequal area is used to detect focus errors. The design of the focus detector, in conjunction with rotation of the axis for the astigmatism and the spacing of the spots projected onto the detector by the optical element permits generation of a focus error signal that compensates for the spot size exceeding the size of the detector and overlap between the spots.

In an alternative embodiment, the optical element generates two sets of focussing spots having opposite axes of astigmatism and the focus detector comprises two portions, each having two photodetector segments. The opposite axes of astigmatism and the shapes and positions of the detector portions permit overlap between the spots to be ignored.

In other embodiments, the focus detector comprises two or more spaced-apart portions, at least one of which has multiple segments. The two or more portions are positioned to receive light from multiple beams of the multi-beam system, thus reducing errors resulting from overlap between the spots projected by the beams. The shape and positioning of the detector portions, and the formula used to compute a focus error based on the signals from the portions, permit beam overlap to be ignored.

Still other embodiments of the focus detector of the present invention include elongated photodetector segments onto which spots generated by multiple beams are directed, and that detect the focus error of more than one of the beams by computing an average.

BRIEF DESCRIPTION OF THE DRAWINGS

Further features of the invention, its nature and various advantages will be more apparent from the accompanying drawings and the following detailed description of the preferred embodiments, in which.

DETAILED DESCRIPTION OF THE INVENTION

The description of the present invention provided herein is organized as follows: first, a previously known single-beam optical pickup that uses a astigmatism focus detector is described as background for the present invention. A multi-beam optical pickup suitable for use with the focus detection methods and apparatus of the present invention is then described. Several illustrative alternative embodiments of the invention are then disclosed.

Figure 1:
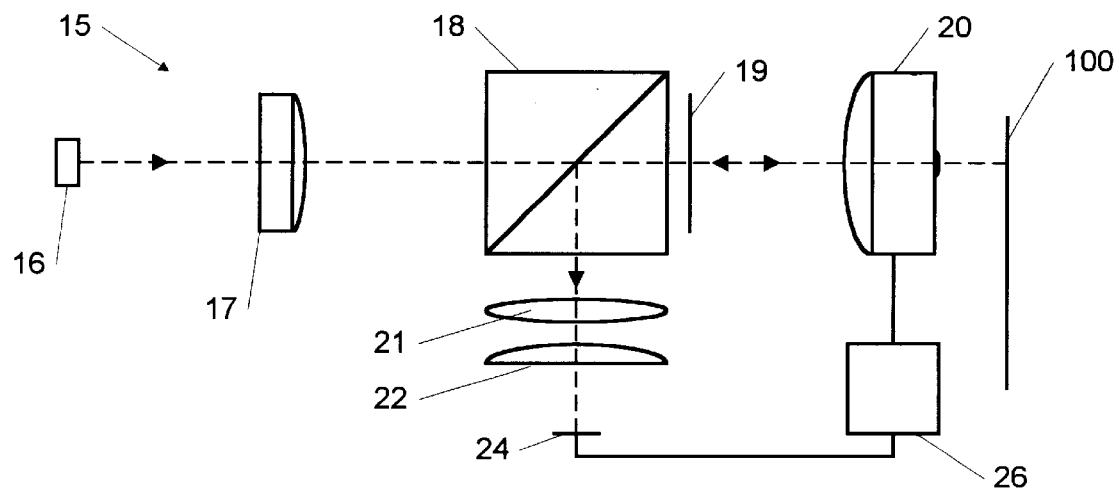
FIG. 1 is a block diagram of a previously known single-beam optical pickup.

Referring to FIG. 1, an illustrative previously known single-beam optical pickup 15 is described in which the astigmatism method is used with a quadrant detector for detecting focus errors. Optical pickup 15 comprises laser diode 16, collimator 17, polarizing beamsplitter 18, quarter-wave plate 19, objective lens 20, detector lens 21, cylindrical lens 22, detector 24, and servo-system 26.

Laser diode 16 produces a coherent beam of light that is collimated by collimator 17. The collimated light beam passes through polarizing beamsplitter 18, and quarter-wave plate 19, which rotates the polarization of the light by a quarter wavelength. The light beam is then projected onto a data-bearing surface of optical disk 100 by objective lens 20.

The light beam is reflected from the surface of optical disk 100, modulated by the data recorded on the data-bearing surface. The modulated, reflected beam again passes through objective lens 20 and quarter-wave plate 19. Quarter-wave plate 19 rotates the polarization of the reflected light beam by an additional quarter wavelength, thus permitting the beam to be reflected by polarizing beamsplitter 18. The reflected beam then passes through detector lens 21, and cylindrical lens 22, that introduces astigmatism and focuses the beam onto quadrant detector 24, located at the best circle plane.

Quadrant detector 24 produces signals indicative of the data read from optical disk 100, the focus error, and the tracking error. Servo system 26 moves objective lens 20 towards or away from optical disk 100 responsive to the focus error signal to keep the system in focus. A second servo system (not shown) adjusts the position of optical pickup 10 responsive to the tracking error signal to keep the system aligned with the data tracks of optical disk 100.

It should be noted that in a system that uses a cylindrical lens to introduce astigmatism, such as is shown in FIG. 1, the best circle plane and the best image plane are not the same. The image of the spot projected at the best circle plane is much larger than the image projected at the best image plane. To correctly determine the focus error using the astigmatism method, detector 24 must be located at the best circle plane.

Figures 2A, 2B, 2C:
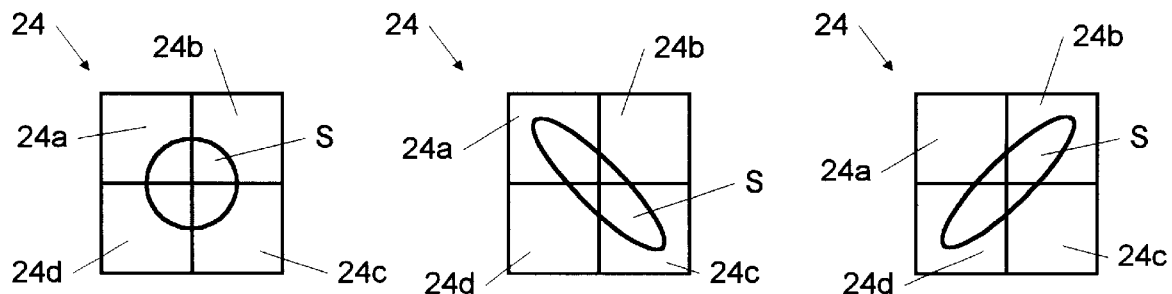
FIGS. 2A to 2C illustrate operation of a previously known quadrant detector used for astigmatic focus error detection, where the image projected onto the detector is in focus, is focussed too near, and is focussed too far, respectively.

Referring to FIG. 2A, generation of a focus error signal using quadrant detector 24 is described. Quadrant detector 24 comprises photodetector segments 24a–d, each of which produces a signal responsive to the amount of light illuminating the segment. A spot, S, the intensity of which is modulated according to the data on optical disk 100, is projected onto detector 24 by the optical components of optical pickup 10, as described above.

The signals from segments 24a–d may be summed to produce a data signal to enable the data from optical disk 100 to be read. Similarly, a tracking error signal may be computed by taking the difference of the sums of the signals from adjacent pairs of segments of detector 24. The tracking error signal may be used to drive a servo system to adjust the position of optical pickup 10 to correct tracking errors. A focus error signal also may be computed by taking the difference of the sums of the signals from opposite pairs of segments of detector 24:

$$E_{Focus} = (A+C) - (B+D) \quad (1)$$

where A, B, C, and D are the signals generated by segments 24a, 24b, 24c, and 24d, respectively. The focus error signal is used to drive servo system 26, which adjusts the position of objective lens 22 to correct focus errors.

When the system is in focus, as shown in FIG. 2A, spot S is circular, and all four segments of detector 24 are illuminated equally. Applying formula (1) yields a focus error value of zero.

When the system is not correctly focussed, the astigmatism introduced by cylindrical lens 22 causes spot S to become elliptical. The axis of the astigmatism depends on the direction in which the system is out of focus. If the system is focussed too near (i.e. the focal point is in front of the surface of the optical disk), as shown in FIG. 2B, spot S will illuminate segments 24a and 24c to a greater extent than segments 24b and 24d, yielding a positive focus error signal. If the system is focussed too far (i.e. the focal point is behind the surface of the optical disk), as shown in FIG. 2C, spot S will illuminate segments 24b and 24d to a greater extent than segments 24a and 24c, resulting in a negative focus error signal.

Figure 3:
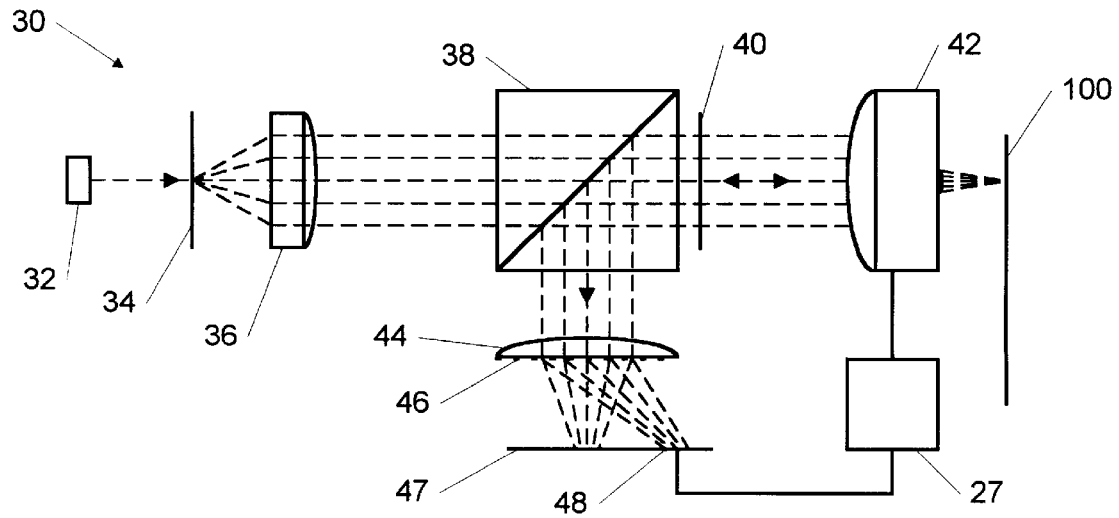
FIG. 3 is a block diagram of a multi-beam optical pickup suitable for use with the focus detection methods and apparatus of the present invention.

Referring now to FIG. 3, a multi-beam optical pickup constructed in accordance with the principles of the present invention is described. Multi-beam optical pickup 30 includes laser diode 32, diffractive element 34, collimator 36, polarizing beamsplitter 38, quarter-wave plate 40, objective lens 42, detector lens 44, optical element 46, detector array 47, focus detector 48, and servo system 27.

In operation, a beam of coherent light produced by laser diode 32 passes through diffractive element 34 and is split into a plurality of reading beams which are used to read multiple tracks of optical disk 100 simultaneously. The plurality of reading beams pass through collimator 36, polarizing beamsplitter 38, and quarter-wave plate 40. Objective lens 42 focusses the plurality of reading beams onto multiple tracks of optical disk 100.

Reflected beams, modulated by the data present in multiple tracks of optical disk 100, again pass through objective lens 42 and quarter-wave plate 40, and are reflected by polarizing beamsplitter 38 towards detector lens 44 and optical element 46. Optical element 46, which may be either a holographic element or diffractive grating, splits the beams into a plurality of order 0 beams, which are directed to a data and tracking detection portion of detector array 47, and a plurality of order 1 beams, which are directed to focus detector 48. Additionally, optical element 46 introduces astigmatism into the order 1 beams to enable use of a modified astigmatic focus method in accordance with the principles of the present invention.

Optical element 46 preferably is a special type of diffraction grating called a diffractive optical element (DOE). Alternatively, optical element 46 may be a holographic optical element (HOE), though use of a HOE is less preferred at present, due to higher cost. DOEs and HOEs may be formed by the use of two interfering coherent laser beams in such a manner that the beams form a suitable angle relative to each other. The interference pattern created by the laser beams is projected onto a substrate, such as glass, that has been coated with a suitable photoresist. When the photoresist is processed and removed, the interference pattern is impressed in the substrate as a series of parallel grooves. Methods of forming diffractive and holographic gratings are discussed in further detail in U.S. Pat. No. 4,560,249 to Nishiwaki et al., incorporated herein by reference, and in Lee, "High Efficiency Multiple Beam Gratings," *Applied Optics*, Vol. 18, pp. 2152–58, Jul. 1979, and Lee, "Binary Synthetic Holograms," *Applied Optics*, Vol. 13, pp. 1677–82, Jul. 1974.

Advantageously, use of optical element 46 to split the reflected beams permits the use of a focus detector spaced apart from detector array 47. Specifically, the focus detector may be configured for use solely for generating the focus error signal, without also serving the functions of a data detector or tracking detector. Focus detector 48 therefore may be especially tailored for detecting focus errors in a multi-beam optical pickup, as described hereinafter.

Additionally, use of optical element 46 permits the best circle plane and the best image plane to coincide. Thus, both the focus and data detectors may be placed in the same plane. Also, if the order 1 beams are off of the optical axis by a large angle, optical element 46 may be designed to compensate for any off-axis optical aberrations.

Figure 4:
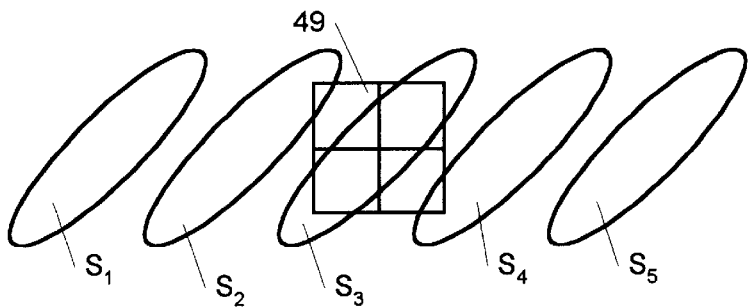
FIG. 4 illustrates a difficulty encountered using a previously known quadrant detector in a multi-beam optical pickup.

With respect to FIG. 4, a drawback associated with using a previously known quadrant focus detector with a multi-beam optical pickup, such as is shown in FIG. 3, is described. When plurality of spots $S_1$–$S_5$ (assuming a 5-beam system) are projected onto focus detector 49, portions of the central spot may fall outside the boundaries of focus detector 49, and multiple spots may illuminate some segments of the focus detector when the system is not in focus. Because some areas of spot $S_3$ fall outside of focus detector 49, while parts of spots $S_2$ and $S_4$ impinge on focus detector 49, an accurate focus error value cannot be easily obtained.

Figure 5A:
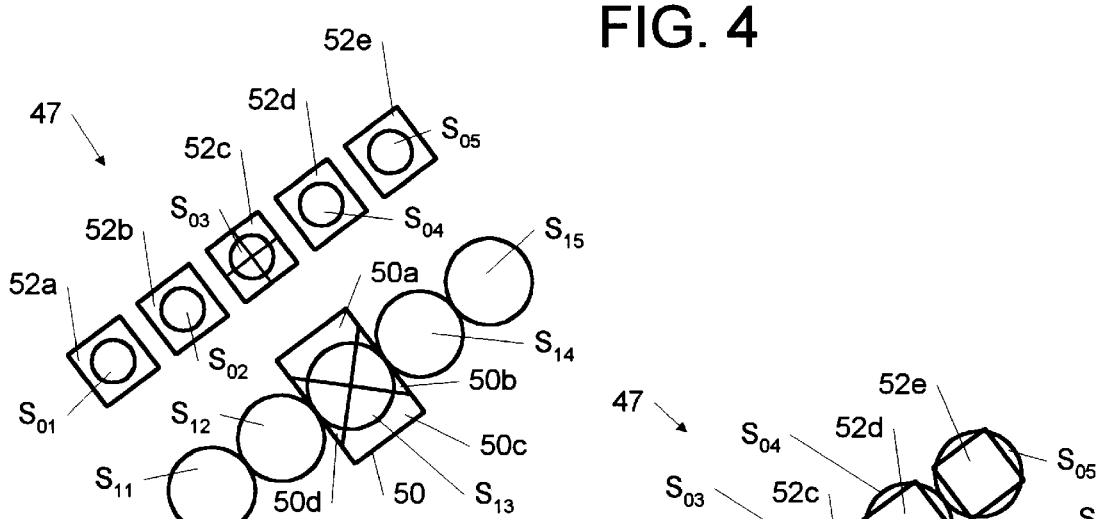
FIGS. 5A to 5C illustrates operation of a first embodiment of a focus detector built in accordance with the principles of the present invention, along with the image projected onto the data detectors when the system is in focus, is focussed too near, and is focussed too far, respectively.
Figure 5B:
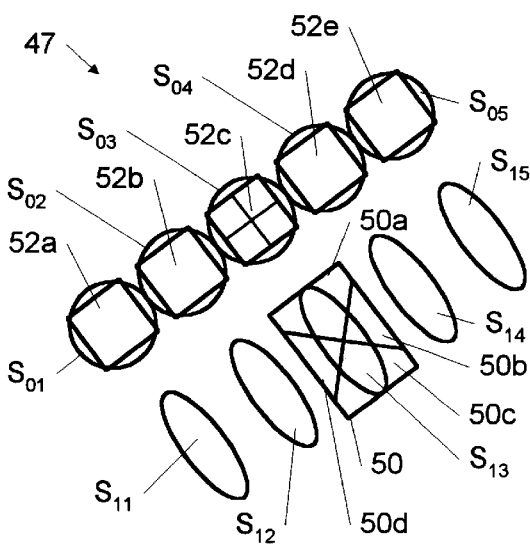
Figure 5C:
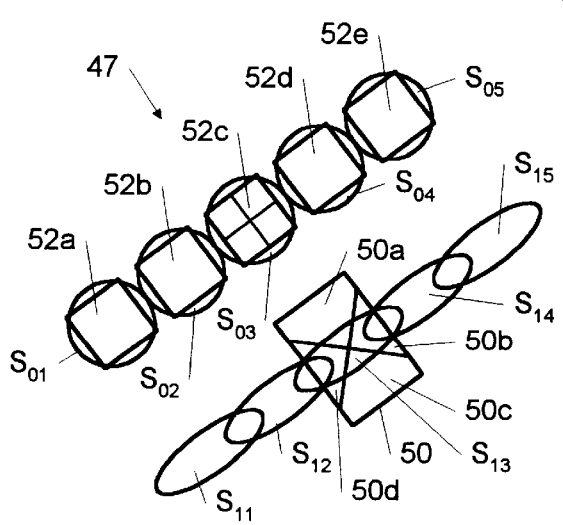

Referring now to FIGS. 5A to 5C, illustrative detector array 47 and focus detector 50 constructed in accordance with the principles of the present invention is described. Detector array 47 comprises data detectors 52a–52e, wherein data detector 52c is a quadrant detector the output of which is also used to generate a tracking error signal. Focus detector 50 comprises photodetector segments 50a–50d, wherein segments 50a and 50c are larger than segments 50b and 50d. The width of detector 50 (i.e. the combined widths of segments 50b and 50d) is selected to be equal to the width of the spot projected onto focus detector 50 when the system is in focus.

In FIG. 5A, when the system is in focus, spot $S_{13}$ projected onto focus detector 50 is circular, so all of segments 50a–50d receive equal amounts of illumination, and produce equal signals. Using formula (1) above to generate a focus error yields a focus error signal of zero.

When the system is focussed too near, the astigmatism introduced by optical element 46 causes order 1 spots $S_{11}$–$S_{15}$ (assuming a 5-beam system) to become elliptical. Because the axis of the astigmatism introduced by optical element 46 is rotated, there is no overlap between the spots when the system is focussed too near. Instead, as shown in FIG. 5B, spot $S_{13}$ projected onto focus detector 50 illuminates segments 50a and 50c more than segments 50b and 50d, yielding a positive value of focus error.

Conversely, when the system is focussed too far, as shown in FIG. 5C, order 1 spots $S_{11}$–$S_{15}$ become elliptical and have an axis orthogonal to the astigmatism axis of the spots of FIG. 5B, so that the ends of the elliptical spots $S_{11}$–$S_{15}$ overlap. Due to the spacing and orientation of spots $S_{11}$–$S_{15}$, and the size of detector 50, any portion of the center spot that falls outside of detector 50 is compensated for by a mirror-image overlap from the adjacent spots. Thus, focus detector 50 may be used to accurately generate a focus error, based on the overlap between adjacent spots, to cancel the effects of spot $S_{15}$ extending beyond the boundaries of the focus detector.

It should be noted that in some embodiments of the multi-beam optical pickups constructed in accordance with the principles of the present invention (particularly those used for both reading and writing), the central beam may have greater power than the surrounding beams. Because this unequal distribution of beam power may affect the degree to which overlap from adjacent spots $S_{12}$ and $S_{14}$ compensates for the energy lost when central spot $S_{13}$ extends outside of detector 50, it may be desirable to locate detector 50 so it is illuminated by light from a non-central beam. Alternatively, in systems where the beams have unequal power, one of the embodiments described hereinbelow may be employed.

Figure 6:
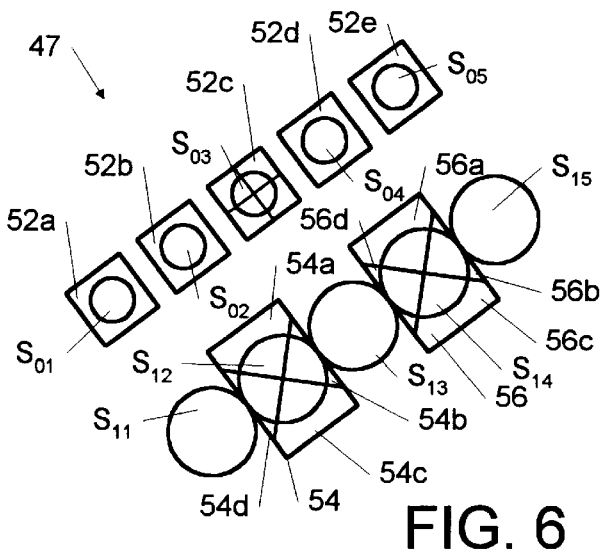
FIG. 6 shows a variation on the embodiment shown in FIGS. 5A to 5C.

FIG. 6 shows a variation of the system described with respect to FIGS. 5A to 5C. The focus system shown in FIG. 6 has two focus detectors, 54 and 56, located so that they will be illuminated by spots $S_{12}$ and $S_{14}$, respectively. A focus error signal is computed by taking the average of the focus errors determined by detector 54 and detector 56, as shown in formula (2):

$$E_{Focus} = ((54a+54c)-(54b+54d)+(56a+56c)-(56b+56d))/2 \qquad (2)$$

Advantageously, basing the calculation of the focus error on beams other than the center beam will reduce the average focus error for all the beams, including those that are farthest from the center beam. This helps compensate for slight variation in the focus of the outer beams as compared to the central beam.

Figure 7A:
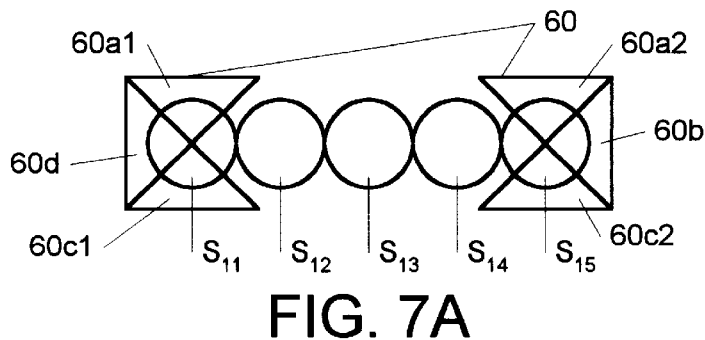
FIGS. 7A to 7C illustrate operation of an alternative embodiment of the present invention when the system is in focus, is focussed too near, and is focussed too far, respectively.
Figure 7B:
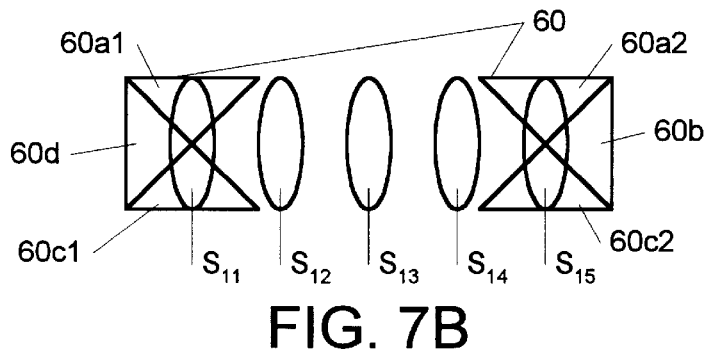
Figure 7C:
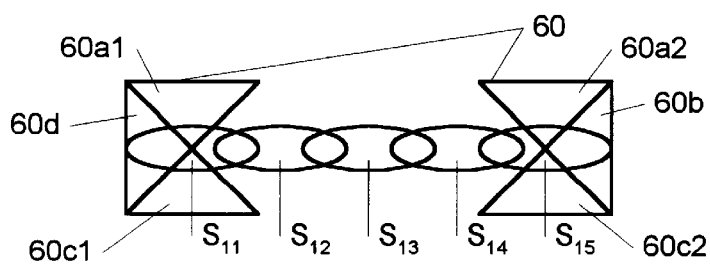

Referring now to FIGS. 7A to 7C, an alternative embodiment of a focus detector of the present invention is described. Focus detector 60 uses outermost order 1 spots $S_{11}$ and $S_{15}$, each of which is overlapped by only one other spot, to determine the focus error, and comprises photodetector segments 60a1, 60a2, 60b, 60c1, 60c2, and 60d. Each segment produces a signal responsive to the amount of light falling on that segment.

With respect to FIG. 7A, when the optical system is in focus, spots $S_{11}$ and $S_{15}$ are circular, and each of the segments receives an equal amount of illumination. Since the sum of segments 60a1, 60a2, 60c1 and 60c2 will outweigh the sum of segments 60b and 60d, it is necessary to compute the focus error using a formula different from formula (1) above. Instead, a focus error signal may be computed using the signals output by focus detector 60 as:

$$E_{Focus}=(60a1+60a2+60c1+60c2)/2-(60b+60d) \quad (3)$$

If all segments are illuminated equally, the focus error will be zero.

When the system is focussed too near, as shown in FIG. 7B, spots $S_{11}$ and $S_{15}$ become elliptical, and illuminate segments 60a1, 60a2, 60c1, and 60c2 more than segments 60b and 60d. Applying the formula (3) above yields a positive value for the focus error. Conversely, when the system is focussed too far, as 30 shown in FIG. 7C, spots $S_{11}$ and $S_{15}$ illuminate segments 60b and 60d more than segments 60a1, 60a2, 60c1, and 60c2, thus yielding a negative focus error value.

Advantageously, because only the outermost spots are used to determine the focus error, each is overlapped by only one adjacent spot. Since there is no detector in the area of the overlap, the overlap has no effect on the focus error calculation. Alternatively, a similar result may be obtained using a focus detector similar to that of FIGS. 7A to 7C, but without segments 60a2 and 60c2. In this case, formula (1) for computing the focus error may be employed.

Figure 8:
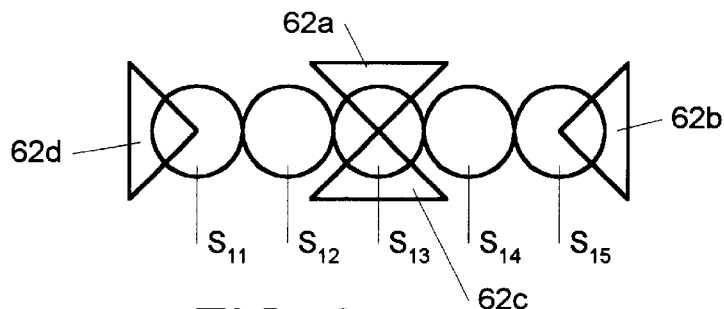
FIG. 8 shows a variation of the embodiment of FIGS. 7A to 7C.

Such a variation of the focus detector of FIGS. 7A to 7C is described with respect to FIG. 8. In the focus detector of FIG. 8, portions of the outermost beams are projected onto segments 62b and 62d, while the central beam is projected onto segments 62a and 62c. A focus error may be computed using this embodiment using the "standard" formula for computing the focus error from a quadrant detector, as shown in formula (1), above.

It should be noted that the embodiments of FIGS. 7A to 7C and FIG. 8 may only be used in systems employing a constant number of beams. In some optical disk reader/writer systems, it may be desirable to change the number of beams. For example, five beams may be used when reading data from the disk, while only one beam is used for writing. During the mode in which only one beam is used, the outermost beams may not be present and the focus detectors of FIGS. 7A to 7C and FIG. 8 may be unable to compute a focus error. If the number of beams projected onto the focus detector by the system may vary, it is desirable to use a focus detector such as depicted in FIGS. 9A to 9C.

Figure 9A:
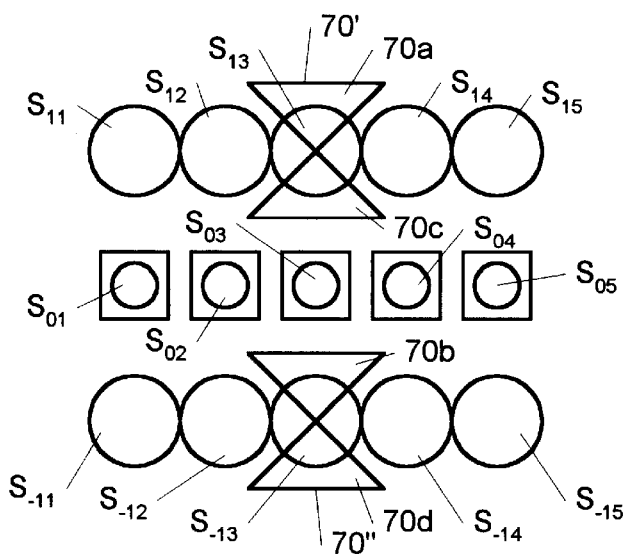
FIGS. 9A to 9C illustrate operation of a further alternative embodiment of the focus detector of the present invention, along with the image projected onto the data detectors when the system is in focus, is focussed too near, and is focussed too far, respectively.
Figure 9B:
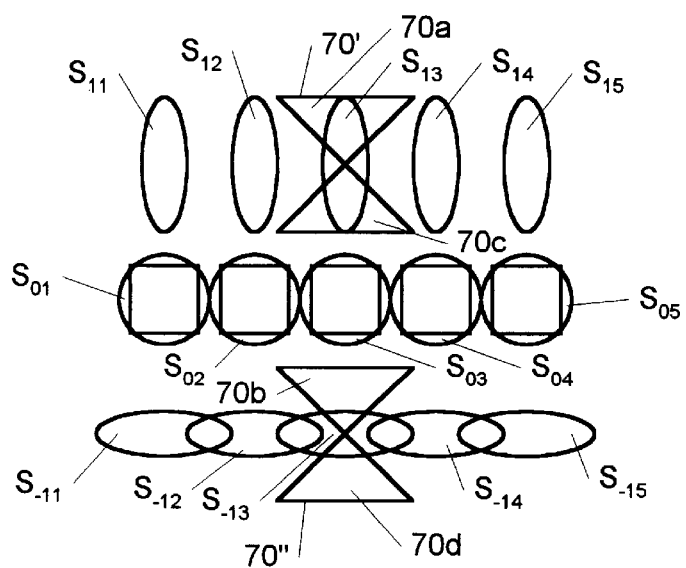
Figure 9C:
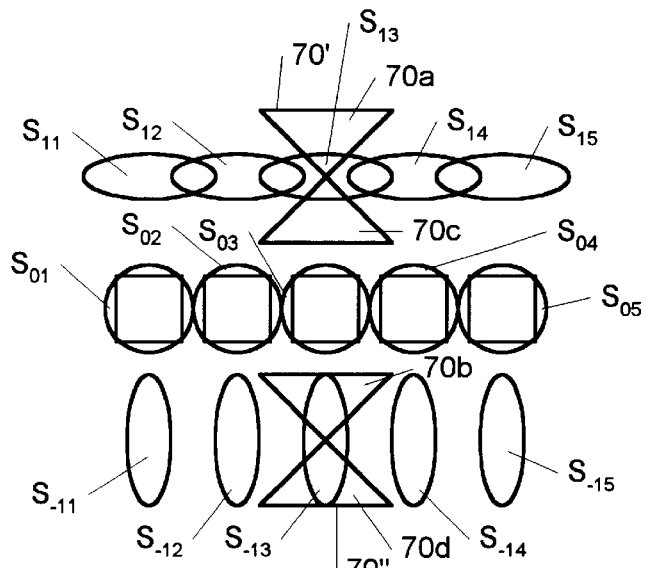

Referring now to FIGS. 9A to 9C, a further alternative embodiment of a focus detector of the present invention is described. Focus detector 70 comprises two portions, 70' and 70". Detector 70' comprises photodetector segments 70a and 70c, while detector 70" comprises photodetector segments 70b and 70d. Portions 70' and 70" of focus detector 70 are positioned on opposite sides of order 0 spots $S_{01}$–$S_{05}$, and are oriented parallel to the axis of the order 0 spots.

In FIGS. 9A to 9C, optical element 46 projects a set of order 0 spots $S_{01}$–$S_{05}$ onto detector array 47, a set of order 1 spots $S_{11}$–$S_{15}$ onto portion 70' (photodetector segments 70a and 70c) of focus detector 70, and a set of order −1 spots $S_{-11}$–$S_{-15}$ onto portion 70" (photodetector segments 70b and 70d) of focus detector 70. Optical element 46 is configured to introduce astigmatism along a first axis into the order 1 spots, and along a second axis, orthogonal to the first axis, into the order −1 spots.

When the system is in focus, as is shown in FIG. 9A, spots $S_{13}$ and $S_{-13}$ are circular, so each of the photodetector segments receives equal amounts of illumination. The focus error may be computed using focus detector 70 according to the formula (4):

$$E_{Focus}=(70a+70c)-(70b+70d) \quad (4)$$

This yields a focus error value of zero when the photodetector segments receive equal illumination.

When the system is out of focus by being focussed too near, as shown in FIG. 9B, order 1 spot $S_{13}$ illuminates focus detector portion 70' more than order −1 spot $S_{-13}$, that has an opposite astigmatism axis, illuminates focus detector portion 70", yielding a positive value for the focus error. Conversely, when the system is focussed too far, as shown in FIG. 9C, the opposite astigmatism axes of the order 1 and order −1 spots cause focus detector portion 70" to receive a greater amount of illumination than focus detector portion 70', resulting in a negative focus error value. Because each of portions 70' and 70" of focus detector 70 has an "hourglass" shape centered at the center of a spot, there is no overlap of spots falling on the photodetector segments. Thus, focus detector 70 produces an accurate focus error value while ignoring overlap between spots.

Focus detector 70 need not be positioned so that it receives illumination from center spots $S_{13}$ and $S_{-13}$, but advantageously may be positioned so that it is illuminated by the order 1 and order −1 projections of one of the non-center spots. This may be particularly desirable because the focus is often worse for the non-center spots than for the center spots.

Figure 10A:
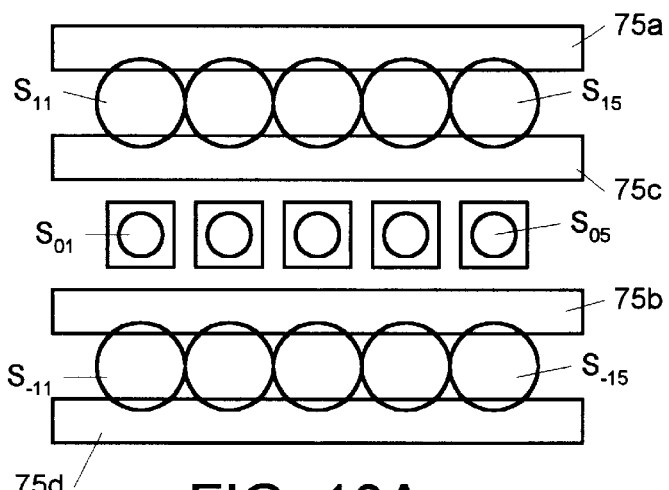
FIGS. 10A to 10C illustrate another embodiment where the image projected onto the data detectors is in focus, is focussed too near, and is focussed too far, respectively.
Figure 10B:
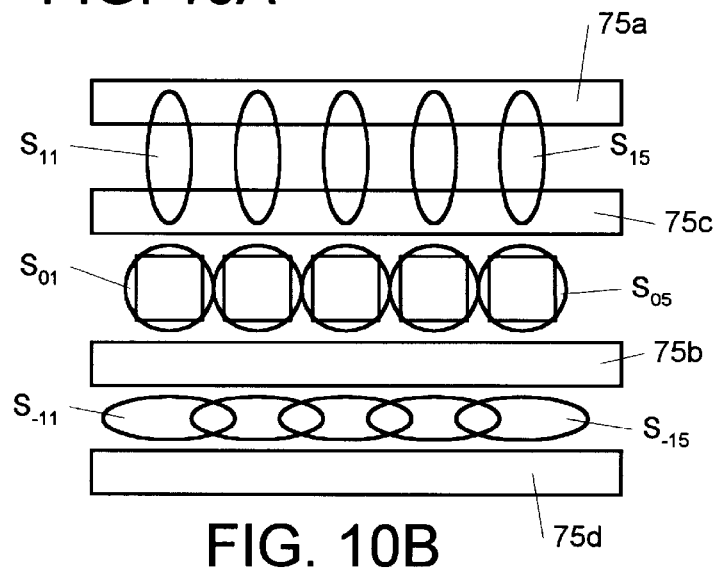
Figure 10C:
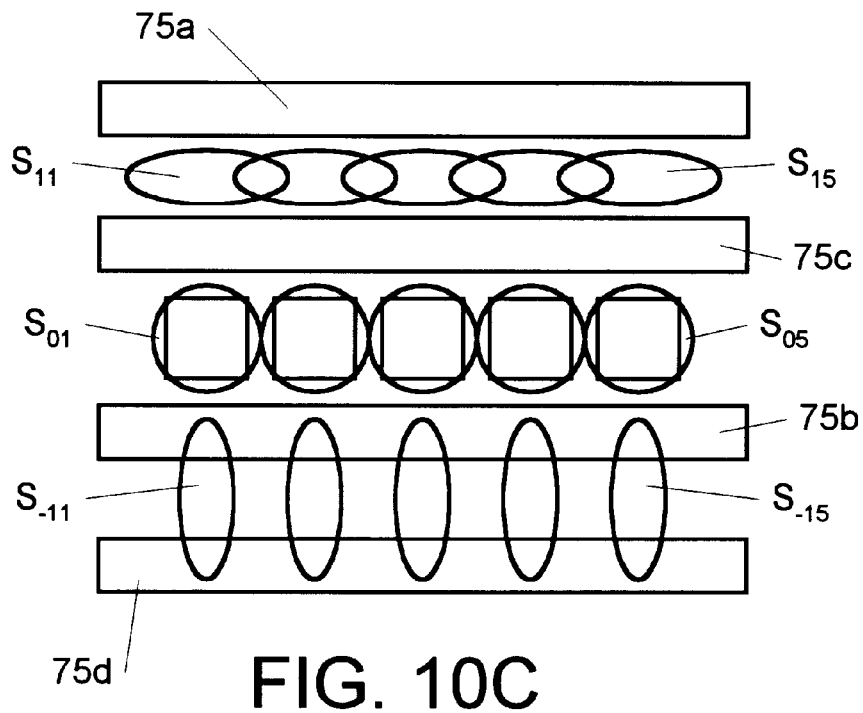

Yet another embodiment of the focus detector of the present invention is described with respect to FIGS. 10A to 10C. Here, the focus detector comprises elongated segments 75a, 75b, 75c and 75d. Spots generated by all of the multiple beams impinge on the four elongated segments, when in focus.

As for the embodiment of FIGS. 9A to 9C, the embodiment of FIGS. 10A to 10C requires that optical element 46 project a set of order 0 spots $S_{01}$–$S_{05}$ onto detector array 47, a set of order 1 spots $S_{11}$–$S_{15}$ onto segments 75a and 75c, and a set of order −1 spots $S_{-11}$–$S_{-15}$ onto segments 70b and 70d. Optical element 46 is configured to introduce astigmatism along a first axis into the order 1 spots, and along a second axis, orthogonal to the first axis, into the order −1 spots.

When the system is in focus, as shown in FIG. 10A, the spots are circular and each of the photodetector segments receives equal amounts of illumination from all of the spots. The focus error may be computed according to the formula (5):

$$E_{Focus}=(75a+75c)-(75b+75d) \quad (5)$$

This formula yields a focus error value of zero when the photodetector segments receive equal illumination from all of the spots.

When the system is out of focus by being focussed too near, as shown in FIG. 10B, order 1 spots $S_{11}$ to $S_{15}$ illuminate segments 75a and 75c more than order −1 spots $S_{-11}$ to $S_{-15}$, that have an opposite astigmatism axis, illuminate segments 75b and 75d, giving a positive value for the focus error.

Conversely, when the system is focussed too far, as shown in FIG. 10C, the opposite astigmatism axes of the order 1 and order −1 spots cause segments 75b and 75d to receive a greater amount of illumination than segments 75a and 75c, resulting in a negative focus error value. As will be apparent from inspection of FIGS. 10A to 10C, overlap between the spots is ignored, since overlapping regions are not projected onto any of the segments.

Advantageously, the elongated photodetector segments inherently provide a signal proportional to the sum of all the light that is projected onto them. Since the segments cover all of the spots projected by the beams, the focus error provided by this embodiment is proportional to the average focus error of all the spots. Additionally, using a focus detector that effectively averages the focus error for all of the spots is expected to provide a more uniform jitter value than systems that use only one of the spots to produce a focus error signal.

Figure 11:
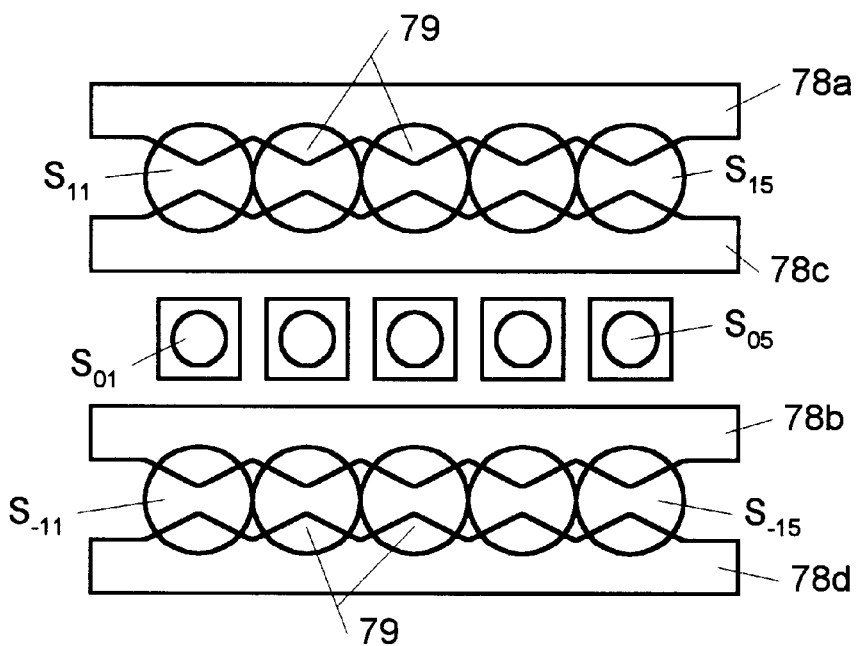
FIG. 11 shows a variant of the embodiment of FIGS. 10A to 10C.

Referring to FIG. 11 an alternative embodiment of the focus error detector of FIGS. 10A to 10C is described. Triangular projections 79 of elongated segments 78a–78d form a saw-tooth edge that may permit this embodiment to provide an improved focus error signal. Due to the triangular shape of the projections 79, overlap between the beams when the system is out of focus (not shown) are not expected to affect the focus error signal. Other variations on the detector described with reference to FIGS. 10A to 10C also are possible. For example, the segments could be shortened to cover only a selected number of the spots.

It will be apparent to one skilled in the relevant arts that many possible variations of the multi-beam optical pickup of FIG. 3 may be used with the focus detection methods and apparatus of the present invention. For example, multiple laser diodes, or combinations of laser diodes and holographic or diffractive elements may be used to generate multiple beams, instead of using a single laser diode and a grating. Also, the grating may be moved to a position after the collimator in the optical path, or combined with the collimator or the beamsplitter, as described, in commonly assigned, copending U.S. patent application Ser. No. 09/027,313. Additionally, other arrangements of the various optical elements may be used. The optical system of FIG. 3 also may form a part of an optical pickup having two or more optical paths for handling multiple wavelengths of light, for example, for use in a system capable of reading both DVD and CD formats.

While preferred illustrative embodiments of the present invention are described above, it will be evident to one skilled in the art that various changes and modifications may be made without departing from the invention. For example, the focus detectors of the present invention may be easily applied to a multi-beam optical pickup having more or fewer beams than described hereinabove. The methods and apparatus of the present invention also may be applied to an optical pickup that both reads and writes multiple tracks of an optical disk simultaneously. It is intended in the appended claims to cover all such changes and modifications that fall within the true spirit and scope of the invention.

What is claimed is:

1. An optical pickup assembly for simultaneously reading a plurality of data tracks from an optical disk, the optical pickup assembly comprising:

means for producing a plurality of reading beams;

an objective lens that focuses the plurality of reading beams onto the plurality of data tracks of the optical disk;

a plurality of data detectors, each data detector producing a data signal responsive to an amount of light illuminating the data detector;

a first focus detector spaced apart from the plurality of data detectors, the first focus detector comprising a plurality of photodetector segments wherein adjacent ones of the photodetector segments have unequal areas, each photodetector segment producing a signal responsive to an amount of light illuminating the photodetector segment, the first focus detector generating a focus error signal responsive to the presence of a focus error by combining the signals produced by the photodetector segments; and an optical element that splits beams reflected from the optical disk into a plurality of data beams and a plurality of focus beams not used for recovering data from the optical disk, the optical element introducing astigmatism into the plurality of focus beams and directing one of the plurality of focus beams to the first focus detector and the plurality of data beams to the plurality of data detectors.

2. The optical pickup assembly of claim 1, further comprising a second focus detector that is illuminated by another of the plurality of focus beams.

3. The optical pickup assembly of claim 2, wherein the plurality of focus beams includes a Plurality of non-central focus beams and the first and second focus detectors are illuminated by first and second ones of the Plurality of non-central focus beams.

4. The optical pickup assembly of claim 3, wherein the optical element comprises either a holographic optical element (HOE) or a diffractive optical element (DOE).

5. An optical pickup assembly for simultaneously reading a plurality of data tracks from an optical disk, the optical pickup assembly comprising:

means for producing a plurality of reading beams;

an objective lens that focuses the plurality of reading beams onto the plurality of data tracks of the optical disk;

a plurality of data detectors, each data detector producing a data signal responsive to an amount of light illuminating the data detector;

a focus detector spaced apart from the plurality of data detectors, the focus detector comprising first and second portions, each of the first and second portions of the focus detector comprises three photodetector segments, each Photodetector segment producing a signal responsive to an amount of light illuminating the photodetector segment, the focus detector generating a focus error signal responsive to the presence of a focus error by combining the signals produced by the photodetector segments; and an optical element that splits beams reflected from the optical disk into a plurality of data beams and a plurality of focus beams, the optical element introducing astigmatism into the plurality of focus beams and directing the plurality of focus beams to the focus detector and the plurality of data beams to the plurality of data detectors.

6. The optical pickup assembly of claim 5 wherein the focus error signal is proportional to the formula:

$$E_{Focus}=(A1+A2+C1+C2)/2-(B+D)$$

where:

$E_{Focus}$ is a signal responsive to the presence of a focus error;

A1, C1, and D are signals produced by the three photodetector segments of the first portion of the focus detector; and A2, C2, and B are signals produced by the three photodetector segments of the second portion of the focus detector.

7. An optical pickup assembly for simultaneously reading a plurality of data tracks from an optical disk, the optical pickup assembly comprising:

means for producing a plurality of reading beams;

an objective lens that focuses the plurality of reading beams onto the plurality of data tracks of the optical disk;

a plurality of data detectors, each data detector producing a data signal responsive to an amount of light illuminating the data detector;

a focus detector spaced apart from the plurality of data detectors, the focus detector comprising first and second portions, the first portion of the focus detector comprising three photodetector segments and the second portion of the focus detector comprising one photodetector segment, each photodetector segment producing a signal responsive to an amount of light illuminating the photodetector segment, the focus detector generating a focus error signal responsive to the presence of a focus error by combining the signals produced by the photodetector segments; and an optical element that splits beams reflected from the optical disk into a plurality of data beams and a plurality of focus beams, the optical element introducing astigmatism into the plurality of focus beams and directing the plurality of focus beams to the focus detector and the plurality of data beams to the plurality of data detectors.

8. An optical pickup assembly for simultaneously reading a plurality of data tracks from an optical disk, the optical pickup assembly comprising:

means for producing a plurality of reading beams;

an objective lens that focuses the plurality of reading beams onto the plurality of data tracks of the optical disk;

a plurality of data detectors, each data detector producing a data signal responsive to an amount of light illuminating the data detector;

a focus detector spaced apart from the plurality of data detectors, the focus detector comprising first and second portions, the first portion of the focus detector comprising two photodetector segments and the second portion of the focus detector comprising two photodetector segments, each photodetector segment producing a signal responsive to an amount of light illuminating the photodetector segment, the focus detector generating a focus error signal responsive to the presence of a focus error by combining the signals produced by the photodetector segments; and an optical element that splits beams reflected from the optical disk into a plurality of data beams and a plurality of focus beams, the optical element introducing astigmatism into the plurality of focus beams and directing the plurality of focus beams to the focus detector and the plurality of data beams to the plurality of data detectors, wherein an outermost focus beams illuminate the first portion and a central focus beam illuminates the second portion.

9. The optical pickup assembly of claim 8, wherein the focus error is proportional to the formula:

$$E_{Focus} = (A+C) - (B+D)$$

where:

$E_{Focus}$ is a signal responsive to the presence of a focus error;

A and C are signals produced by the two of the photodetector segments that are illuminated by the central focus beam; and B and D are signals produced by the two of the photodetector segments that are illuminated by the outer focus beams.

10. An optical pickup assembly for simultaneously reading a plurality of data tracks from an optical disk, the optical pickup assembly comprising:

means for producing a plurality of reading beams;

an objective lens that focuses the plurality of reading beams onto the plurality of data tracks of the optical disk;

a plurality of data detectors, each data detector producing a data signal responsive to an amount of light illuminating the data detector;

a focus detector spaced apart from the plurality of data detectors, the focus detector comprising a plurality of photodetector segments, each photodetector segment producing a signal responsive to an amount of light illuminating the photodetector segment, the focus detector generating a focus error signal responsive to the presence of a focus error by combining the signals produced by the photodetector segments; and an optical element that splits beams reflected from the optical disk into a plurality of data beams and first and second pluralities of focus beams, the optical element introducing astigmatism along a first axis into the first plurality of focus beams, and astigmatism along a second axis into the second plurality of focus beams, the optical element further directing the plurality of data beams to the plurality of data detectors, the first plurality of focus beams to a first portion of the focus detector, and the second plurality of focus beams to a second portion of the focus detector.

11. The optical pickup assembly of claim 10, wherein the first axis is orthogonal to the second axis.

12. The optical pickup assembly of claim 11, wherein the first and second portions of the focus detector are disposed so that the first portion of the focus detector is illuminated by a first focus beam, and the second portion of the focus detector is illuminated by a second focus beam, the second focus beam corresponding to the first focus beam but having an axis of astigmatism orthogonal to an axis of astigmatism of the first focus beam.

13. The optical pickup assembly of claim 12, wherein the first and second portions of the focus detector each comprises two photodetector segments.

14. The optical pickup assembly of claim 13, wherein each of the photodetector segments has a triangular shape, and the photodetector segments are disposed so that each of the first and second portions of the focus detector has an hourglass shape.

15. The optical pickup assembly of claim 14, wherein the first portion of the focus detector is oriented along the same axis as the second portion of the focus detector.

16. The optical pickup assembly of claim 10, wherein a first portion of the focus detector comprises a first elongated segment that is illuminated by at least two of the first plurality of focus beams and a second portion of the focus detector comprises a second elongated segment that is illuminated by at least two of the second plurality of focus beams.

17. The optical pickup assembly of claim 16, wherein each one of the first and second elongated segments has a saw-tooth edge.

18. The optical pickup assembly of claim 16, wherein the first elongated segment is illuminated by all of the first plurality of focus beams and the second elongated segment is illuminated by all of the second plurality of focus beams.

19. The optical pickup assembly of claim 16, wherein the focus detector determines an average focus error for the plurality of focus beams that illuminate the focus detector indicating the direction and degree to which the corresponding reading beams are out of focus, the focus error signal is proportional to the average focus error of the plurality of focus beams that illuminate the focus detector.

20. A method of simultaneously reading a plurality of tracks of an optical disk, the method comprising:
   generating a plurality of reading beams;
   focusing the plurality of reading beams onto a plurality of tracks of the optical disk;
   splitting beams reflected from the plurality of tracks of the optical disk into a plurality of data beams and a plurality of focus beams;
   introducing astigmatism into the plurality of focus beams;
   directing the plurality of data beams onto a plurality of data detectors;
   directing the plurality of focus beams onto a focus detector spaced apart from the plurality of data detectors, the focus detector comprising a plurality of photodetector segments wherein adjacent ones of the photodetector segments have unequal areas, each photodetector segment producing a signal responsive to an amount of light illuminating the photodetector segment;
   combining the signals produced by the photodetector segments to generate a focus error signal responsive to the presence of a focus error; and
   using the focus error signal to adjust the focus of the plurality of reading beams.

21. The method of claim 20, wherein directing the plurality of focus beams onto the focus detector further comprises using more than one of the focus beams to illuminate the focus detector.

22. A method of simultaneously reading a plurality of tracks of an optical disk, the method comprising:
   generating a Plurality of reading beams;
   focusing the plurality of reading beams onto a plurality of tracks of the optical disk;
   splitting beams reflected from the plurality of tracks of the optical disk into a plurality of data beams and a plurality of focus beams;
   introducing astigmatism into the plurality of focus beams;
   directing the plurality of data beams onto a plurality of data detectors;
   directing the plurality of focus beams onto a focus detector spaced apart from the plurality of data detectors, the focus detector comprising first and second portions, each photodetector segment producing a signal responsive to an amount of light illuminating the photodetector segment, wherein a first non-central beam illuminates the first portion of the focus detector, and a second non-central beam illuminates the second portion of the focus detector;
   combining the signals produced by the photodetector segments to generate a focus error signal responsive to the presence of a focus error; and
   using the focus error signal to adjust the focus of the plurality of reading beams.

23. The method of claim 22 wherein each of the first and second portions of the focus detector comprises three photodetector segments, and combining the signals from the photodetector segments to generate the focus error signal comprises using the formula:

$$E_{Focus}=(A1+A2+C1+C2)/2-(B+D)$$

where:
   $E_{Focus}$ is a signal responsive to the presence of a focus error;
   A1, C1, and D are signals produced by the three photodetector segments of the first portion of the focus detector; and
   A2, C2, and B are signals produced by the three photodetector segments of the second portion of the focus detector.

24. A method of simultaneously reading a plurality of tracks of an optical disk, the method comprising:
   generating a plurality of reading beams;
   focusing the plurality of reading beams onto a plurality of tracks of the optical disk;
   splitting beams reflected from the plurality of tracks of the optical disk into a plurality of data beams and a plurality of focus beams;
   introducing astigmatism into the plurality of focus beams;
   directing the plurality of data beams onto a plurality of data detectors;
   directing the plurality of focus beams onto a focus detector spaced apart from the plurality of data detectors, the focus detector comprising four photodetector segments, each photodetector segment producing a signal responsive to an amount of light illuminating the photodetector segment, wherein outermost focus beams illuminate two of the photodetector segments, and a central focus beam illuminates two of the photodetector segments;
   combining the signals produced by the photodetector segments to generate a focus error signal responsive to the presence of a focus error; and
   using the focus error signal to adjust the focus of the plurality of reading beams.

25. The method of claim 24, wherein combining the signals from the photo detector segments to generate the focus error comprises using the formula:

$$E_{Focus}=(A+C)-(B+D)$$

where:
   $E_{Focus}$ is a signal responsive to the presence of a focus error;
   A and C are signals produced by two of the photodetector segments that are illuminated by the central focus beam; and
   B and D are signals produced by two of the photodetector segments that are illuminated by the outer focus beams.

26. A method of simultaneously reading a plurality of tracks of an optical disk, the method comprising:
   generating a plurality of reading beams;
   focusing the plurality of reading beams onto a plurality of tracks of the optical disk;
   splitting beams reflected from the plurality of tracks of the optical disk into a plurality of data beams, a first plurality of focus beams, and a second plurality of focus beams;

introducing astigmatism along a first axis into the first plurality of focus beams, and introducing astigmatism along a second axis, orthogonal to the first axis, into the second plurality of focus beams;

directing the plurality of data beams onto a plurality of data detectors;

directing the plurality of focus beams onto a focus detector spaced apart from the plurality of data detectors, each photodetector segment producing a signal responsive to an amount of light illuminating the photodetector segment;

combining the signals produced by the photodetector segments to generate a focus error signal responsive to the presence of a focus error; and using the focus error signal to adjust the focus of the plurality of reading beams.

27. The method of claim 26, wherein directing the focus beams comprises directing the first plurality of focus beams to a first portion of the focus detector, so that at least one of the first plurality of focus beams illuminates the first portion of the focus detector, and directing the second plurality of focus beams to a second portion of the focus detector, so that at least one of the second plurality of focus beams illuminates the second portion of the focus detector.

28. The method of claim 27, wherein more than one of the first plurality of focus beams illuminates the first portion of the focus detector, and more than one of the second plurality of focus beams illuminates the second portion of the focus detector.

29. The method of claim 28, wherein combining the signals produced by the photodetector segments further comprises generating the focus error signal so that it determines an average focus error for the plurality of focus beams that illuminate the focus detector indicating the direction and degree to which the corresponding reading beams are out of focus, wherein the focus error signal is proportional to the average focus error of the plurality of focus beams that illuminate the focus detector.

* * * * *